(12) United States Patent
Tanaka

(10) Patent No.: US 7,697,463 B2
(45) Date of Patent: Apr. 13, 2010

(54) RADIO APPARATUS

(75) Inventor: Yasuhiro Tanaka, Aichi (JP)

(73) Assignee: Sanyo Electric Co., Ltd., Osaka (JP)

( * ) Notice: Subject to any disclaimer, the term of this patent is extended or adjusted under 35 U.S.C. 154(b) by 940 days.

(21) Appl. No.: 11/485,973

(22) Filed: Jul. 14, 2006

(65) Prior Publication Data

US 2007/0014258 A1 Jan. 18, 2007

Related U.S. Application Data

(60) Provisional application No. 60/698,951, filed on Jul. 14, 2005, provisional application No. 60/699,850, filed on Jul. 18, 2005.

(51) Int. Cl.
*H04B 7/00* (2006.01)

(52) U.S. Cl. ...................................... 370/310

(58) Field of Classification Search ......... 370/276–278, 370/310, 324, 341–350, 431, 432, 436, 437, 370/449, 458; 709/227, 228, 248
See application file for complete search history.

(56) References Cited

U.S. PATENT DOCUMENTS

| | | | | | |
|---|---|---|---|---|---|
| 5,363,373 | A | * | 11/1994 | Nakahara et al. | 370/314 |
| 5,483,537 | A | * | 1/1996 | Dupuy | 370/337 |
| 5,519,710 | A | * | 5/1996 | Otsuka | 370/337 |
| 5,930,018 | A | * | 7/1999 | Effenberger | 398/161 |
| 6,031,846 | A | * | 2/2000 | Gurusami et al. | 370/508 |
| 6,539,003 | B1 | * | 3/2003 | Agarwal et al. | 370/324 |
| 6,741,614 | B1 | | 5/2004 | Porter et al. | |
| 7,117,257 | B2 | * | 10/2006 | Beshai | 709/221 |
| 7,151,944 | B2 | * | 12/2006 | Hashem et al. | 455/502 |
| 7,212,540 | B2 | * | 5/2007 | Unitt et al. | 370/452 |
| 2004/0042492 | A1 | | 3/2004 | Suzuki et al. | |
| 2005/0157694 | A1 | | 7/2005 | Lu et al. | |

FOREIGN PATENT DOCUMENTS

EP   1 286 491 A1   2/2003

(Continued)

OTHER PUBLICATIONS

Coleri, Sinem et al.: "Channel Estimation Techniques Based on Pilot Arrangement in OFDM Systems," IEEE Transactions on Broadcasting, vol. 48, No. 3, pp. 223-229, Sep. 2002.

(Continued)

*Primary Examiner*—Dmitry H Levitan
(74) *Attorney, Agent, or Firm*—McDermott Will & Emery LLP

(57) ABSTRACT

A control unit estimates the time required from when signals are transmitted respectively to a plurality of terminal apparatuses to when responses from them are received. In a plurality of partial periods, partial periods for receiving signals continue after partial periods for transmitting the signals continue, and the order of terminal apparatuses assigned in the partial periods for receiving signals are defined in the order of terminal apparatuses assigned in the partial periods for transmitting signals, and the control unit assigns a terminal apparatus, whose estimated required time is longer, to an early partial period in a series of partial periods for transmitting signals. A radio unit and the like perform communication with the plurality of terminal apparatuses to which the respective plurality of partial periods have been assigned.

6 Claims, 10 Drawing Sheets

FOREIGN PATENT DOCUMENTS

| JP | 2006-035303 A | 2/2006 |
| WO | WO 2005/025088 A1 | 3/2005 |

OTHER PUBLICATIONS

Povey, et al., "A Review of Time Division Duplex-CDMA Techniques," Spread Spectrum Techniques and Applications, 1998 IEEE 5th International Symposium on Sun City, South Africa, Sep. 2, 1998, pp. 630-633, vol. 2, IEEE, New York, NY, USA.

International Search Report and Written Opinion of the International Searching Authority issued in corresponding International Patent Application No. PCT/JP2006/314138, dated Sep. 28, 2006.

* cited by examiner

FIG.3A

| STS1 | LTS1 | SIGNAL | DATA 1 |
|---|---|---|---|
| STS2 | LTS2 | SIGNAL | DATA 2 |

FIG.3B

| L-STS | L-LTS | SIGNAL | STS1 | LTS1 | SIGNAL | DATA 1 |
|---|---|---|---|---|---|---|
| L-STS +CDD | L-LTS +CDD | SIGNAL +CDD | STS2 | LTS2 | SIGNAL | DATA 2 |

RADIO APPARATUS

RELATED APPLICATIONS

This application claims priority of U.S. Provisional Application No. 60/698,951 filed on Jul. 14, 2005, and U.S. Provisional Application No. 60/699,850, filed on Jul. 18, 2005, the disclosures of which Applications are incorporated by reference herein.

BACKGROUND OF THE INVENTION

1. Field of the Invention

The present invention relates to radio apparatuses, and it particularly relates to a radio apparatus using multiple subcarriers.

2. Description of the Related Art

An OFDM (Orthogonal Frequency Division Multiplexing) modulation scheme is one of multicarrier communication schemes that can realize the high-speed data transmission and are robust in the multipath environment. This OFDM modulation scheme has been applied to the wireless standards such as IEEE802.11a/g and HIPERLAN/2. The packet signals in such a wireless LAN are generally transferred via a time-varying channel environment and are also subjected to the effect of frequency selective fading. Hence, a receiving apparatus generally carries out the channel estimation dynamically.

In order for the receiving apparatus to carry out the channel estimation, two kinds of known signals are provided within a packet signal. One is the known signal, provided for all carriers in the beginning of the packet signal, which is the so-called preamble or training signal. The other is the known signal, provided for part of carriers in the data area of the packet signal, which is the so-called pilot signal (See Reference (1) in the following Related Art List, for instance).

RELATED ART LIST (1) Sinem Coleri, Mustafa Ergen, Anuj Puri and Ahmad Bahai, "Channel Estimation Techniques Based on Pilot Arrangement in OFDM Systems", *IEEE Transactions on broadcasting*, vol. 48, No. 3, pp. 223-229, September 2002.

In wireless communications, adaptive array antenna technology is one of the technologies to realize the effective utilization of frequency resources. In adaptive array antenna technology, the directional patterns of antennas are controlled by controlling the amplitude and phase of signals, to be processed, in a plurality of antennas, respectively. One of techniques to realize higher data transmission rates by using such an adaptive array antenna technology is the MIMO (Multiple-Input Multiple-Output) system. In this MIMO system, a transmitting apparatus and a receiving apparatus are each equipped with a plurality of antennas, and a plurality of packet signals to be transmitted in parallel are set (hereinafter, each of data to be transmitted in parallel in the packet signal is called "stream"). That is, streams up to the maximum number of antennas are set for the communications between the transmitting apparatus and the receiving apparatus so as to improve the data transmission rates.

Moreover, combining such a MIMO system with the OFDM modulation scheme results in a higher data transmission rate. In such a MIMO system, CSMA (Carrier Sense Multiple Access) is carried out to allow the base station apparatus to multiplex a plurality of terminal apparatuses. For the purpose of improving the transmission efficiency or reducing the processing delay, the base station apparatus specifies, in partial periods of time, the timing at which the signals are to be transmitted to a plurality of terminal apparatuses (hereinafter referred to as "transmit timing") and the timing at which the signals from a plurality of terminal apparatuses are to be received (hereinafter referred to as "receive timing"). Then the base station apparatus informs respectively the plurality of terminal apparatuses of said specification, and each of the plurality of terminal apparatuses carries out a processing in accordance with said specification (hereinafter, such a processing will be referred to as "assignment mode"). Here it is assumed that after a plurality of transmit timings for the plurality of terminals are specified consecutively, a plurality of receive timings are specified consecutively. A terminal apparatus receives a signal at the specified transmit timing. When the receiving has been successful, a terminal apparatus generates an ACK signal and transmits the ACK signal to the base station apparatus at the specified receive timing. When the receiving has failed, the terminal apparatus does not generate the signal.

The inventor of the present invention came to realize the following problems to be solved under the circumstances as described above. That is, even when a terminal apparatus has succeeded in receiving the signal, the terminal apparatus cannot transmit an ACK signal if it fails to generate the ACK signal at or before the receive timing. As a result, there will be a delay in the transmitting of the ACK signal, which will in turn cause also a delay in the subsequent processing at the base station apparatus. On the other hand, the processing speeds in a plurality of terminal apparatuses are generally not the same, and various processing speeds exist. Moreover, the number of streams in a packet signal to be received by a plurality of terminals differs. Generally speaking, the greater the number of streams, the more the amount of processing involved in the receiving by a terminal apparatus will result and the longer the processing period will be.

SUMMARY OF THE INVENTION

The present invention has been made in view of the foregoing circumstances and an object thereof is to provide a radio apparatus which determines communication timings in such a manner as to realize efficient communication with a plurality of terminal apparatuses.

In order to solve the above problems, a radio apparatus according to a preferred embodiment of the present invention comprises: an assigning unit which partitions a given period into a plurality of partial periods and assigns the plurality of partial periods to a plurality of terminal apparatuses by associating the partial periods with the terminal apparatuses; and a communication unit which performs communication with the plurality of terminal apparatuses to which the respective plurality of partial periods have been assigned by the assigning unit. The assigning unit includes: an estimation unit which estimates time required from when signals are transmitted respectively to the plurality of terminal apparatuses to when responses therefrom are received; and an execution unit which assigns a terminal apparatus, whose required time estimated by the estimation unit is longer, to an early partial period in a series of partial periods for transmitting signals wherein, in the plurality of partial periods, partial periods for receiving signals continue after the partial periods for transmitting signals continue and wherein the order of terminal apparatuses assigned in the partial periods for receiving signals are defined in the order opposite to the order of terminal apparatuses assigned in the partial periods for transmitting signals.

According to this embodiment, an early partial period in a series of partial periods for transmitting signals is assigned to a terminal apparatus where time required from the receiving of a signal to the transmission of a response signal is longer. Thus, the permissible period for a receiving processing in said terminal apparatus can be made longer.

Another preferred embodiment of the present invention relates also to a radio apparatus. This apparatus comprises: an assigning unit which partitions a given period into a plurality of partial periods and assigns the plurality of partial periods to a plurality of terminal apparatuses by associating the partial periods with the terminal apparatuses; and a communication unit which performs communication with the plurality of terminal apparatuses to which the respective plurality of partial periods have been assigned by the assigning unit. The assigning unit includes: an estimation unit which estimates time required from when signals are transmitted respectively to the plurality of terminal apparatuses to when responses therefrom are received; and an execution unit which assigns a terminal apparatus, whose required time estimated by the estimation unit is longer, to an early partial period in a series of partial periods for transmitting signals wherein, in the plurality of partial periods, partial periods for receiving signals continue after the partial periods for transmitting signals continue and wherein the order of terminal apparatuses assigned in the partial periods for receiving signals is defined in the order of terminal apparatuses assigned in the partial periods for transmitting signals.

According to this embodiment, the order for the assignment of receive timings is set identical to the order for the assignment of transmit timings, so that the processing can be simplified.

Still another preferred embodiment of the present invention relates also to a radio apparatus. This apparatus comprises: an assigning unit which partitions a given period into a plurality of partial periods and assigns the plurality of partial periods to a plurality of terminal apparatuses by associating the partial periods with the terminal apparatuses; and a communication unit which performs communication with the plurality of terminal apparatuses to which the respective plurality of partial periods have been assigned by the assigning unit. The assigning unit includes: an estimation unit which estimates time required from when signals are transmitted respectively to the plurality of terminal apparatuses to when responses therefrom are received; and an execution unit which estimates time required, in each order, from when a signal is transmitted to the terminal apparatus to when a response therefrom is received and which assigns a terminal apparatus, whose required time estimated by the estimation unit is longer, to a partial period corresponding to the order in which the time required is longer wherein, in the plurality of partial periods, partial periods for receiving signals continue after the partial periods for transmitting signals continue and wherein the order of terminal apparatuses assigned in the partial periods for receiving signals is defined in the order of terminal apparatuses assigned in the partial periods for transmitting signals.

According to this embodiment, a terminal apparatus with a longer processing period from the receiving of a signal to the transmission of a response signal is assigned to the transmit timing at which a receive-transmit period is longer. Hence, the possibility that said terminal apparatus can transmit the signal can be raised.

Still another preferred embodiment of the present invention relates also to a radio apparatus. This apparatus comprises: an assigning unit which partitions a given period into a plurality of partial periods and assigns the plurality of partial periods to a plurality of terminal apparatuses by associating the partial periods with the terminal apparatuses; and a communication unit which performs communication with the plurality of terminal apparatuses to which the respective plurality of partial periods have been assigned by the assigning unit. The assigning unit includes: an identifying unit which identifies processing speeds for the respective plurality of terminal apparatuses; and an execution unit which assigns a terminal apparatus, identified by the identifying unit, whose processing speed is low, to an early partial period in a series of partial periods for transmitting signals wherein, in the plurality of partial periods, partial periods for receiving signals continue after the partial periods for transmitting signals continue and wherein the order of terminal apparatuses assigned in the partial periods for receiving signals is defined in the order opposite to the order of terminal apparatuses assigned in the partial periods for transmitting signals.

According to this embodiment, a terminal apparatus whose processing speed is slow is assigned to an early partial period in a series of partial periods for transmitting signals. Thus, the permissible period for a receiving processing in said terminal apparatus can be made longer.

Still another preferred embodiment of the present invention relates also to a radio apparatus. This apparatus comprises: an assigning unit which partitions a given period into a plurality of partial periods and assigns the plurality of partial periods to a plurality of terminal apparatuses by associating the partial periods with the terminal apparatuses; and a communication unit which performs communication with the plurality of terminal apparatuses to which the respective plurality of partial periods have been assigned by the assigning unit. The assigning unit includes: an identifying unit which identifies processing speeds for the respective plurality of terminal apparatuses; and an execution unit which assigns a terminal apparatus, whose processing speed identified by the identified unit is low, to an early partial period in a series of partial periods for transmitting signals wherein, in the plurality of partial periods, partial periods for receiving signals continue after the partial periods for transmitting signals continue and wherein the order of terminal apparatuses assigned in the partial periods for receiving signals is defined in the order of terminal apparatuses assigned in the partial periods for transmitting signals.

According to this embodiment, the order for the assignment of receive timings is set identical to the order for the assignment of transmit timings, so that the processing can be simplified.

Still another preferred embodiment of the present invention relates also to a radio apparatus. This apparatus comprises: an assigning unit which partitions a given period into a plurality of partial periods and assigns the plurality of partial periods to a plurality of terminal apparatuses by associating the partial periods with the terminal apparatuses; and a communication unit which performs communication with the plurality of terminal apparatuses to which the respective plurality of partial periods have been assigned by the assigning unit. The assigning unit includes: an identifying unit which identifies processing speeds for the respective plurality of terminal apparatuses; and an execution unit which estimates time required, in each order, from when a signal is transmitted to a terminal apparatus to when a response therefrom is received and which assigns a terminal apparatus, whose processing speed identified by the identified unit is low, to a partial period corresponding to the order in which the time required is longer wherein, in the plurality of partial periods, partial periods for receiving signals continue after the partial periods for transmitting signals continue and wherein the order of terminal apparatuses assigned in the partial periods for receiving signals is defined in the order of terminal apparatuses assigned in the partial periods for transmitting signals.

According to this embodiment, a terminal apparatus whose processing speed is low is assigned to the transmit timing at which a receive-transmit period is longer. Hence, the possibility that said terminal apparatus can transmit the signal can be raised.

The identifying unit may include: a measurement unit which measures time periods from when signals are transmitted respectively to the plurality of terminal apparatuses to when responses to the signals are received, respectively; and an execution unit which identifies processing speeds, based on the time periods measured by the measurement unit. In this case, the time required from the receiving of a signal until the transmission of a response signal is identified, so that the allocation in accordance with a CPU or the like of terminal apparatus can be realized.

The identifying unit may include: a reception unit which receives information on the processing speeds from the respective plurality of terminal apparatuses; and an execution unit which identifies the processing speeds, based on the information received by the reception unit.

Still another preferred embodiment of the present invention relates also to a radio apparatus. This apparatus comprises: an assigning unit which partitions a given period into a plurality of partial periods and assigns the plurality of partial periods to a plurality of terminal apparatuses by associating the partial periods with the terminal apparatuses; and a communication unit which performs communication, using at least one stream, with the plurality of terminal apparatuses to which the respective plurality of partial periods have been assigned by the assigning unit. The assigning unit includes: an identifying unit which identifies the number of streams for each of the plurality of terminal apparatuses; and an execution unit which assigns a terminal apparatus, whose number of streams identified by the identifying unit is large, to an early partial period in a series of partial periods for transmitting signals wherein, in the plurality of partial periods, partial periods for receiving signals continue after the partial periods for transmitting signals continue and wherein the order of terminal apparatuses assigned in the partial periods for receiving signals is defined in the order opposite to the order of terminal apparatuses assigned in the partial periods for transmitting signals.

According to this embodiment, a terminal apparatus whose number of streams is large is assigned to an early partial period in a series of partial periods for transmitting signals. Thus, the permissible period for a receiving processing in said terminal apparatus can be made longer.

Still another preferred embodiment of the present invention relates also to a radio apparatus. This apparatus comprises: an assigning unit which partitions a given period into a plurality of partial periods and assigns the plurality of partial periods to a plurality of terminal apparatuses by associating the partial periods with the terminal apparatuses; and a communication unit which performs communication with the plurality of terminal apparatuses to which the respective plurality of partial periods have been assigned by the assigning unit. The assigning unit includes: an identifying unit which identifies the number of streams for each of the plurality of terminal apparatuses; and an execution unit which assigns a terminal apparatus, whose number of streams identified by the identifying unit is large, to an early partial period in a series of partial periods for transmitting signals wherein, in the plurality of partial periods, partial periods for receiving signals continue after the partial periods for transmitting signals continue and wherein the order of terminal apparatuses assigned in the partial periods for receiving signals is defined in the order of terminal apparatuses assigned in the partial periods for transmitting signals.

According to this embodiment, the order for the assignment of receive timings is set identical to the order for the assignment of transmit timings, so that the processing can be simplified.

Still another preferred embodiment of the present invention relates also to a radio apparatus. This apparatus comprises: an assigning unit which partitions a given period into a plurality of partial periods and assigns the plurality of partial periods to a plurality of terminal apparatuses by associating the partial periods with the terminal apparatuses; and a communication unit which performs communication with the plurality of terminal apparatuses to which the respective plurality of partial periods have been assigned by the assigning unit. The assigning unit includes: an identifying unit which identifies the number of streams for each of the plurality of terminal apparatuses; and an execution unit which estimates time required, in each order, from when a signal is transmitted to the terminal apparatus to when a response therefrom is received and which assigns a terminal apparatus, whose number of streams identified by the identified unit is larger, to a partial period corresponding to the order in which the time required is longer wherein, in the plurality of partial periods, partial periods for receiving signals continue after the partial periods for transmitting signals continue and wherein the order of terminal apparatuses assigned in the partial periods for receiving signals is defined in the order of terminal apparatuses assigned in the partial periods for transmitting signals.

According to this embodiment, a terminal apparatus whose number of streams is large is assigned to the transmit timing at which a receive-transmit period is longer. Hence, the possibility that said terminal apparatus can transmit the signal can be raised.

In the partial periods for receiving signals the communication unit may receive a response to a signal transmitted in the partial periods for transmitting signals from the terminal apparatus.

Data may be composed of a plurality of streams. A known signal may be composed of a plurality of streams. A control signal may be composed of a plurality of streams.

It is to be noted that any arbitrary combination of the above-described structural components and expressions changed among a method, an apparatus, a system, a recording medium, a computer program and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A and 3B illustrate packet formats in the communication system shown in FIG. 2.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

An outline of the present invention will be given before describing a detail description thereof. Embodiments of the present invention relate to a MIMO system comprised of a plurality of radio apparatuses. One of the radio apparatuses corresponds to a base station apparatus whereas the rest thereof correspond to a plurality of terminal apparatuses. The base station apparatus basically performs CSMA on a plurality of terminal apparatuses. Over a certain period of time, the base station apparatus performs an assignment mode. Under such circumstances, the terminal apparatus receives signals at transmit timing, and the base station apparatus performs processing as follows in order that the terminal apparatus can receive the signals at the transmit timing and it can generate an ACK signal before or at the receive timing.

Before executing a specification, the base station apparatus identifies the respective processing speeds of a plurality of terminal apparatuses and carries out an assignment mode, which reflects the identified processing speeds. To be more precise, the base station apparatus specifies a plurality of receive timings consecutively after specifying a plurality of transmit timings consecutively. Moreover, the base station apparatus specifies the receive timings for the terminal apparatuses in an order opposite to the order in which the transmit timings have been specified to the terminal apparatuses. In other words, if the terminal apparatuses are, for instance, denoted by "1" to "3", the base station apparatus specifies the transmit timings in the order of "1" to "3" and then specifies the receive timings in the order of "3" to "1". In doing so, the base station apparatus assigns an earlier transmit timing to a terminal apparatus with a lower processing speed. As a result, the duration from a transmit timing to a receive timing will be longer for a terminal apparatus with a lower processing speed.

Figure 1:
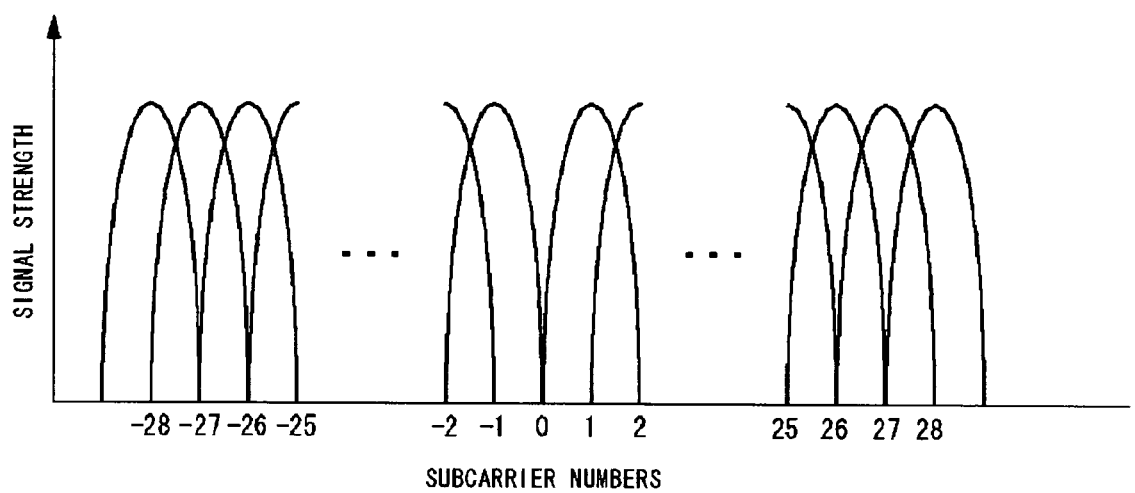
FIG. 1 illustrates a spectrum of a multicarrier signal according to an embodiment of the present invention.

FIG. 1 illustrates a spectrum of a multicarrier signal according to an embodiment of the present invention. In particular, FIG. 1 shows a spectrum of a signal in the OFDM modulation scheme. One of a plurality of carriers in an OFDM modulation scheme is generally called a subcarrier. Herein, however, a subcarrier is designated by a "subcarrier number". In a MIMO system, 56 subcarriers, namely, subcarrier numbers "−28" to "28" are defined. It is to be noted that the subcarrier number "0" is set to null so as to reduce the effect of a direct current component in a baseband signal. On the other hand, 52 subcarriers, namely, subcarrier numbers "−26" to "26" are defined in a communication system which is not compatible with a MIMO (such a communication systems as this will be hereinafter referred to as a legacy system). One example of legacy systems is a wireless LAN complying with the IEEE802.11a standard.

The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM.

Convolutional coding is applied, as an error correction scheme, to these signals. The coding rates for the convolutional coding are set to ½, ¾ and so forth. The number of data to be transmitted in parallel is set variably. The data are transmitted as packet signals and each of packet signals to be transmitted in parallel is called "stream" herein. As a result thereof, since the mode of modulation scheme, the values of coding rate and the number of streams are set variably, the data rate is also set variably. It is to be noted that the "data rates" may be determined by arbitrary combination of these factors or by one of them.

Figure 2:
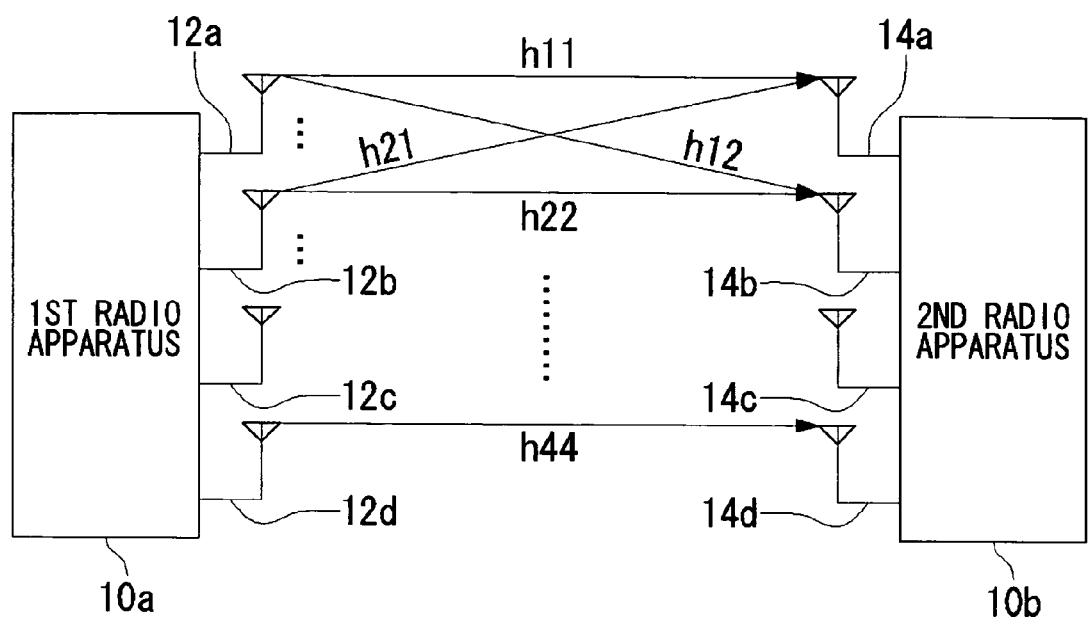
FIG. 2 illustrates a structure of a communication system according to an embodiment of the present invention.

FIG. 2 illustrates a structure of a communication system 100 according to an embodiment of the present invention. The communication system 100 includes a first radio apparatus 10a and a second radio apparatus 10b, which are generically referred to as "radio apparatus 10". The first radio apparatus 10a includes a first antenna 12a, a second antenna 12b, a third antenna 12c and a fourth antenna 12d, which are generically referred to as "antennas 12", and the second radio apparatus 10b includes a first antenna 14a, a second antenna 14b, a third antenna 14c and a fourth antenna 14d, which are generically referred to as "antennas 14". Here, the first radio apparatus 10a corresponds to a base station apparatus, whereas the second radio apparatus 10b corresponds to a terminal apparatus. The first radio apparatus 10a may connect to a plurality of terminal apparatuses, not shown. Here the plurality of terminal apparatuses not shown are represented by the third radio apparatus 10c, fourth radio apparatus 10d and the like. When connecting with the plurality of terminal apparatuses, the first radio apparatus 10a basically performs CSMA. As described earlier, the first radio apparatus 10a also performs an assignment mode. The assignment mode will be discussed later in detail.

An outline of a MIMO system is given before a description of a structure of the communication system 100. Assume herein that data are being transmitted from the first radio apparatus 10a to the second radio apparatus 10b. The first radio apparatus 10a transmits respectively data of multiple streams from the first antenna 12a to the fourth antenna 12d, respectively. As a result, the data rate becomes higher. The second radio apparatus 10b receives the data of multiple streams by the first antenna 14a to the fourth antenna 14d. The second radio apparatus 10b separates the received signals by adaptive array signal processing and demodulates independently the data of multiple streams.

Since the number of antennas 12 is "4" and the number of antennas 14 is also "4" here, the number of combinations of channels between the antennas 12 and the antennas 14 is "16". The channel characteristic between from the ith antenna 12i to the jth antenna 14j is denoted by $h_{ij}$. In FIG. 2, the channel characteristic between the first antenna 12a and the first antenna 14a is denoted by $h_{11}$, that between the first antenna 12a and the second antenna 14b by $h_{12}$, that between the second antenna 12b and the first antenna 14a by $h_{21}$, that between the second antenna 12b and the second antenna 14b by $h_{22}$, and that between the fourth antenna 12d and the fourth antenna 14d by $h_{44}$. For the clarity of illustration, it is omitted to show the other channels in FIG. 2.

FIGS. 3A and 3B illustrate packet formats used by a communication system 100. FIG. 3A shows packet formats in which preamble signals corresponding to a MIMO system are placed at the top portion. Here it is assumed that data contained in two streams are to be transmitted, and a packet format corresponding to a first stream is shown in the top row and that corresponding to a second stream in the bottom row. In the packet signal corresponding to the first stream, "STS (Short Training Sequence) 1" and "LTS (Long Training Sequence) 1" are assigned as preamble signals, whereas in the packet signal corresponding to the second stream, "STS2" and "LTS2" are assigned as preamble signals. Here, "STS1" and "STS2", as well as "LTS1" and "LTS2", are signals having different patterns from each other.

FIG. 3B shows packet formats in which a preamble signal corresponding to a legacy system is additionally placed anterior to a preamble signal corresponding to a MIMO system. Here the STS and LTS of the preamble signal corresponding to a legacy system are denoted as "L-STS" and "L-LTS", respectively, in the first stream. On the other hand, "L-STS" and the like are assigned in the second stream as well. In so doing, the "L-STS" and the like in the second stream are ones to which a CDD (Cyclic Delay Diversity) processing has been applied, for instance. In other words, the L-STS assigned to the second stream is equal to the L-STS assigned to the first stream which has been given a cyclic timing shift. Here, as shown in the bottom row of FIG. 3B, the L-STS having been subjected to a CDD processing is denoted by "L-STS+CDD". The same applies to a case where "L-STS" and the like are assigned to a third stream and the like.

A "SIGNAL" is placed between the preamble signal corresponding to a legacy system and the preamble signal corresponding to a MIMO system. The "SIGNAL" contains information indicating that a preamble signal corresponding to a MIMO system is assigned posterior thereto. Accordingly, when a communication apparatus of a legacy system has received this packet signal, the communication apparatus may discard this packet signal from the content of the "SIGNAL". The information indicating the assignment of such a preamble signal may be the length of a packet signal. That is, it is only necessary that some signal can be determined to last for a certain period of time. Either of the packet formats shown in FIGS. 3A and 3B may be used. The packet format of FIG. 3A, which has less of redundant signal components, can improve the utilization efficiency. On the other hand, the packet format of FIG. 3B, with the addition of a preamble signal corresponding to a legacy system, allows the detection thereof by a communication apparatus corresponding to a legacy system.

Figure 4:
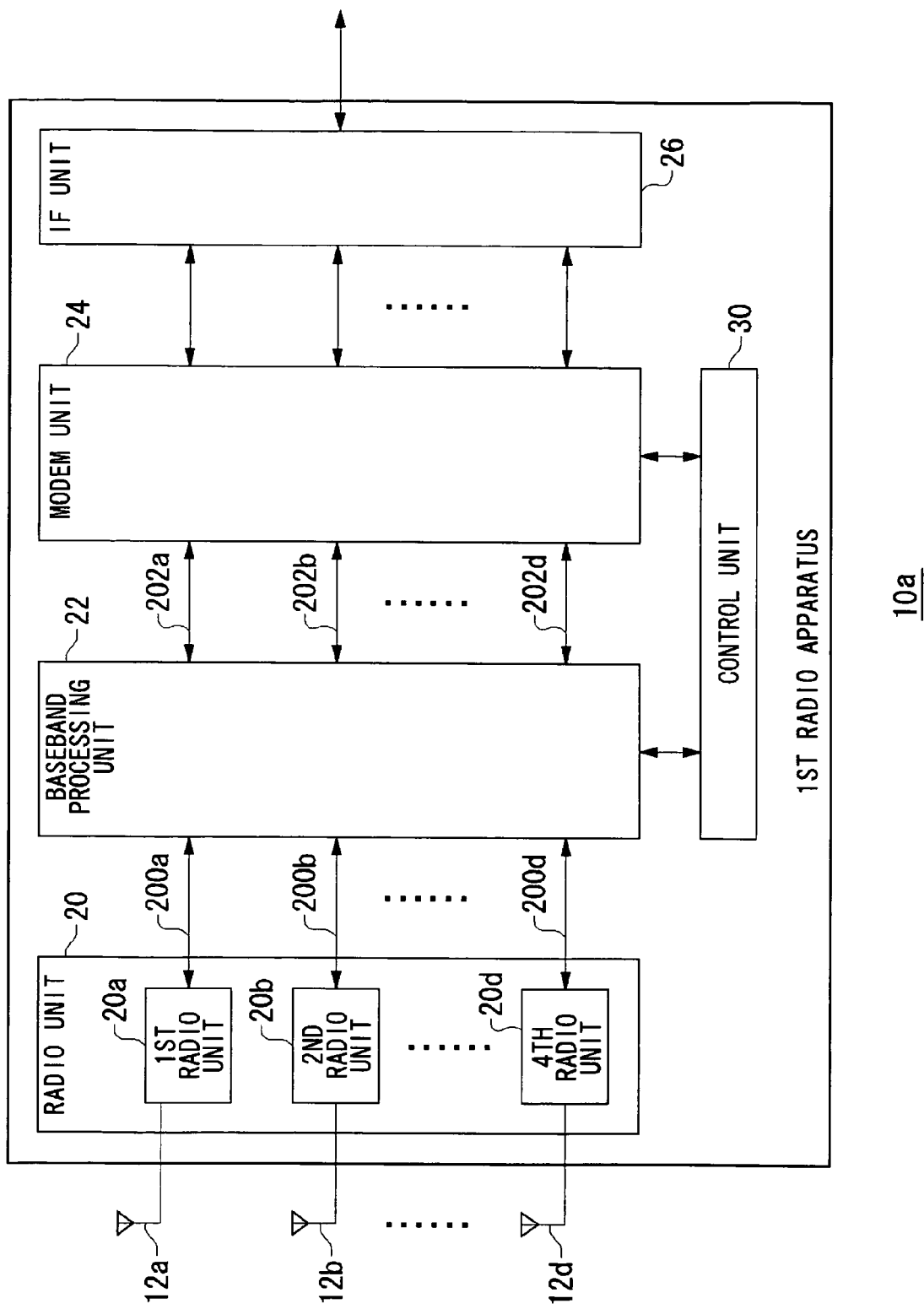
FIG. 4 illustrates a structure of a first radio apparatus shown in FIG. 2.

FIG. 4 illustrates a structure of a first radio apparatus 10a. The first radio apparatus 10a includes a first radio unit 20a, a second radio unit 20b, . . . and a fourth radio unit 20d, which are generically referred to as "radio unit 20", a baseband processing unit 22, a modem unit 24, an IF Interface unit 26 and a control unit 30. Signals involved include a first time-domain signal 200a, a second time-domain signal 200b, . . . and a fourth time-domain signal 200d, which are generically referred to as "time-domain signal 200", and a first frequency-domain signal 202a, a second frequency-domain signal 202b, a third frequency-domain signal 202c and a fourth frequency-domain signal 202d, which are generically referred to as "frequency-domain signal 202". It is to be noted that the second radio apparatus 10b is so structured as to correspond to the first radio apparatus 10a.

As a receiving operation, the radio unit 20 carries out frequency conversion of radiofrequency signal received by the antennas 12 so as to derive baseband signals. The radio unit 20 outputs the baseband signals to the baseband processing unit 22 as the time-domain signals 200. The baseband signal, which is composed of in-phase components and quadrature components, shall generally be transmitted by two signal lines. For the clarity of figure, the baseband signal is presented here by a single signal line only. An AGC Automatic Gain Control unit and an A-D conversion unit are also included.

As a transmission operation, the radio unit 20 carries out frequency conversion of baseband signals from the baseband processing unit 22 so as to derive radiofrequency signals. Here, the baseband signal from the baseband processing unit 22 is also indicated as the time-domain signal 200. The radio unit 20 outputs the radiofrequency signals to the antennas 12. A PA (Power Amplifier) and a D-A conversion unit are also included. It is assumed herein that the time-domain signal 200 is a multicarrier signal converted to the time domain and is a digital signal.

As a receiving operation, the baseband processing unit 22 converts a plurality of time-domain signals 200 respectively into the frequency domain and performs adaptive array signal processing on the thus converted frequency-domain signals. Then the baseband processing unit 22 outputs the result of adaptive array signal processing as the frequency-domain signals 202. One frequency-domain signal 202 corresponds to data contained respectively in a plurality of streams transmitted from the second radio apparatus 10b, not shown here. As a transmission operation, the baseband processing unit 22 inputs, from the modem unit 24, the frequency-domain signals 202 serving as signals in the frequency domain, converts the frequency-domain signals into time domain and then outputs the thus converted signals as time-domain signals by associating them respectively to a plurality of antennas 12.

It is assumed that the number of antennas 12 to be used in the transmission processing is specified by the control unit 30. It is assumed herein that the frequency-domain signal 202, which is a signal in the frequency domain, contains a plurality of subcarrier components as shown in FIG. 1. For the clarity of figure, the frequency-domain signal is arranged in the order of the subcarrier numbers, and forms serial signals.

Figure 5:
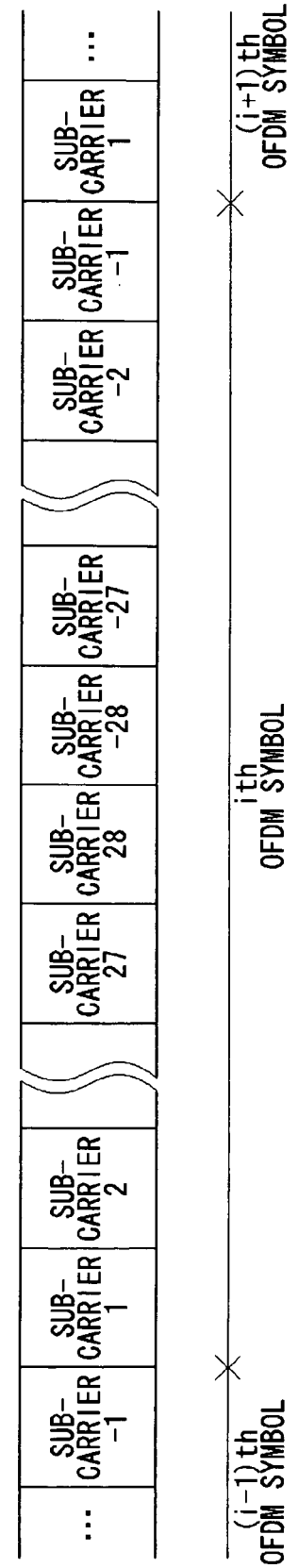
FIG. 5 illustrates a structure of a frequency-domain signal shown in FIG. 4.

FIG. 5 illustrates a structure of a frequency-domain signal. Assume herein that a combination of subcarrier numbers "−28" to "28" shown in FIG. 1 constitutes an "OFDM symbol". An "i"th OFDM symbol is such that subcarriers components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol.

Now refer back to FIG. 4. The baseband processing unit 22 performs CDD to generate packet signals corresponding to FIG. 3B. CDD is performed as a matrix C expressed by the following Equation (1).

$$C(\lambda)=dia(1,\exp(-j2\pi\lambda\delta/Nout),\Lambda,\exp(-j2\pi\lambda\delta(Nout-1)/Nout)) \quad (1)$$

where δ indicates a shift amount and λ indicates the subcarrier number. The multiplication of C with streams is carried out per subcarrier. That is, the baseband processing unit 22 performs a cyclic time shifting within L-STS or the like on a stream-by-stream basis. The shift amounts are each set to a different value per stream.

As a receiving processing, the modem unit 24 demodulates and decodes the frequency-domain signal 202 outputted from the baseband processing unit 22. The demodulation and decoding are carried out per subcarrier. The modem unit 24 outputs the decoded signal to the IF unit 26. As a transmission processing, the modem unit 24 carries out coding and modulation. The modem unit 24 outputs the modulated signal to the baseband processing unit 22 as a frequency-domain signal 202. When the transmission processing is carried out, the modulation scheme and coding rate are specified by the control unit 30.

As a receiving processing, the IF unit 26 combines signals outputted from a plurality of modem units 24 and then forms one data stream. The IF unit 26 outputs the data stream. As a transmission processing, the IF unit 26 inputs one data stream and then separates it. Then the IF unit 26 outputs the thus separated data to the plurality of modem units 24.

The control unit 30 controls the timing and the like of the first radio apparatus 10*a*. When it multiplexes a plurality of terminal apparatuses, the control unit 30 performs CSMA. CSMA is a known technology and the description thereof is omitted here. In addition to CSMA, the control unit 30 performs an assignment mode. The assignment mode is performed in a given period. Before performing the assignment mode, the control unit 30 notifies a plurality of terminal apparatuses of the start of assignment mode via the baseband processing unit 22 and the like. In addition to the terminal apparatus contained in the assignment mode, terminal apparatuses which are not contained in the assignment mode are also counted as those which receive the notice of start.

In the assignment mode, the control unit 30 transmits control information in a leading portion. Following the control information, packet signals to be sent to a plurality of terminal apparatuses are assigned. The packet signals to be assigned are formed, for instance, by a series of a plurality of packet signals. Also, at least one of the packet signals to be assigned is time-divided, and the time-divided parts may be assigned to the terminal apparatuses, respectively. In either structure, the control unit 30 allocates partial periods for transmitting signals to a plurality of terminal apparatuses. It is to be noted that the partial periods may show individual periods for individual terminal apparatuses or show integrally a period for a plurality of terminal apparatuses. Herein, however, no distinction is made as to the mode of assignment of partial periods.

Furthermore, following the partial periods for transmitting signals, the control unit 30 assigns partial periods for receiving signals from a plurality of terminal apparatuses, respectively. The terminal apparatuses transmit packet signals to a first radio apparatus 10*a* in their respectively assigned partial periods. For this, a plurality of packets are assigned consecutively. That is, the control unit 30 divides a given period into a plurality of partial periods and assigns the plurality of respective partial periods correspondingly to a plurality of terminal apparatuses. It is to be noted that the control signal contains information indicating the correspondence between the partial periods and the terminal apparatuses.

Here, a description is given of a method for assigning and allocating terminal apparatuses to the partial periods. Before executing an assignment mode, the control unit 30 identifies respective processing speeds for a plurality of terminal apparatuses. Here the processing speed is a concept that includes the speed of processing by a terminal apparatus from its receiving a packet signal and generating an ACK signal until its transmitting the ACK signal. Generally, the processing speed is dependent on the processing speed of CPU included in the terminal apparatus and so forth. The determination or identifying of the processing speeds by the control unit 30 is carried out as follows. The control unit 30 transmits predetermined packet signals respectively to a plurality of terminal apparatuses via a baseband processing unit 22 or the like. The predetermined packet signals are transmitted as normal data at the time of CSMA.

The control unit 30 measures the period from its transmitting a packet signal to its receiving an ACK signal corresponding to said packet signal for each of the terminal apparatuses. The control unit 30 identifies a processing speed based on the period thus measured. For example, the control unit 30 identifies a terminal apparatus with a shorter measured period as a terminal apparatus with a higher processing speed. It is to be noted that the control unit 30 may process the measured periods statistically and identify the processing speeds based on the periods processed statistically. Such determination is equivalent to the estimation of the required period from the transmission of respective signals to a plurality of terminal apparatuses to the receiving of their ACK signals.

In the assignment mode, as described above, there are a plurality of partial periods, which are composed of a series of partial periods for transmitting signals and a subsequent series of partial periods for receiving signals. A "series of" or "being contiguous" meant here is not a series without breaks between partial periods, but is rather a series with breaks to which no other partial period having another function is assigned. What is meant here, in other words, is a series that has no partial period for receiving a signal assigned to the break between partial periods for transmitting signals. It is to be noted that the order of the terminal apparatuses assigned to the partial periods for receiving signals is so defined to be opposite to the order of the terminal apparatuses assigned to the partial periods for transmitting signals. As described earlier, for connecting with three terminal apparatuses designated as the second radio apparatus 10*b* to the fourth radio apparatus 10*d*, the base station apparatus specifies transmit timings in the order of the second radio apparatus 10*b* to the fourth radio apparatus 10*d* and specifies receive timings in the order of the fourth radio apparatus 10*d* to the second radio apparatus 10*b*.

Moreover, the control unit 30 assigns terminal apparatuses with lower processing speeds to the earlier or front periods of the series of partial periods for transmitting signals. That is, the previous example is a case where the second radio apparatus 10*b* is the terminal apparatus with the lowest processing speed. By an assignment like this, the second radio apparatus 10*b* has a longer period from its receiving a packet signal and generating an ACK signal to its transmitting the ACK signal. It is to be noted here that the terminal apparatuses transmit their ACK signals in the partial periods when they are to transmit signals. The baseband processing unit 22 and the like of the first radio apparatus 10*a* receive the ACK signals. Upon recognizing the receipt of the ACK signals, the control unit 30 has the baseband processing unit 22 and the like prepare the next packet signals to be transmitted to the terminal apparatuses.

In terms of hardware, this structure can be realized by a CPU, a memory and other LSIs of an arbitrary computer. In terms of software, it is realized by memory-loaded programs which have communication functions and the like, but drawn and described herein are function blocks that are realized in cooperation with those. Thus, it is understood by those skilled in the art that these function blocks can be realized in a variety of forms such as by hardware only, software only or the combination thereof.

Figure 6:
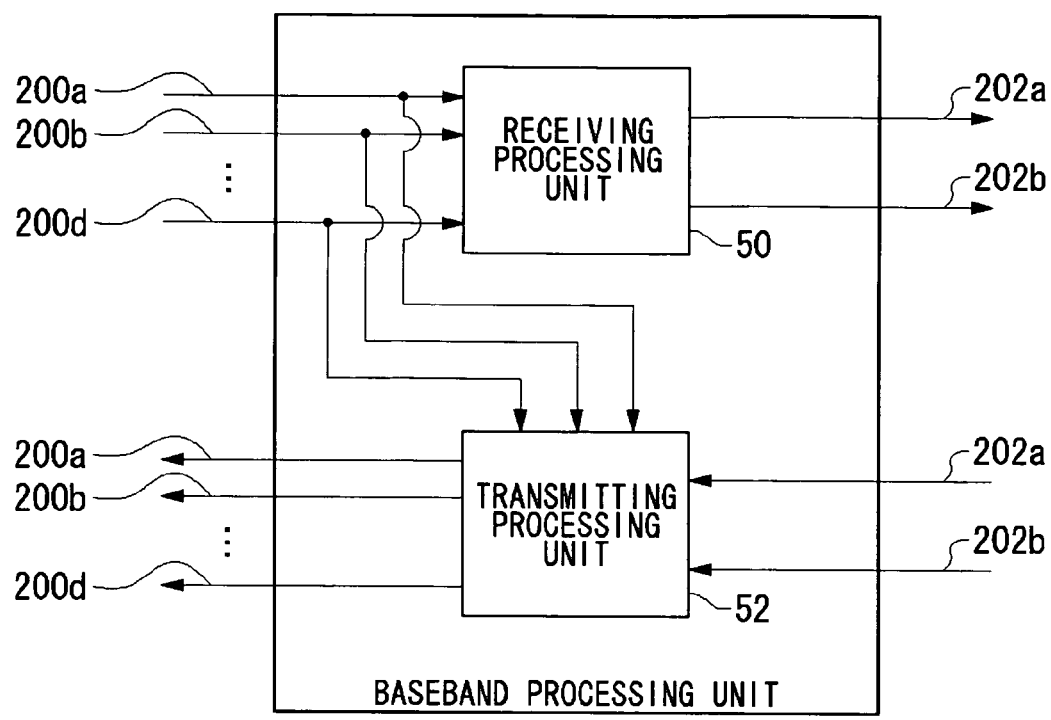
FIG. 6 illustrates a structure of a baseband processing unit shown in FIG. 4.

FIG. 6 illustrates a structure of a baseband processing unit 22. The baseband processing unit 22 includes a processing unit for use with receiving 50 and a processing unit for use with transmission 52. The receiving processing unit 50 executes a part, corresponding to a receiving operation, of operations by the baseband processing unit 22. That is, the receiving processing unit 50 performs adaptive array signal processing on time-domain signals 200 and, for this purpose, derives receiving weight vectors. Then the receiving processing unit 50 outputs the result of array synthesis as the frequency-domain signal 202.

A processing of receiving processing unit 50 will now be described in a specific manner. The receiving processing unit 50 inputs a plurality of time-domain signals 200 and then performs Fourier transform on them, respectively, so as to derive frequency-domain signals. As described earlier, a frequency-domain signal is such that signals corresponding to subcarriers are arranged serially in the order of subcarrier numbers.

The receiving processing unit 50 weights the frequency-domain signals with receiving weight vectors, and a plurality of weighted signals are added up. Since the frequency-domain signal is composed of a plurality of subcarriers, the above processing is also executed on a subcarrier-by-subcarrier basis. As a result, the signals summed up are also arranged serially, as shown in FIG. 5, in the order of subcarrier numbers. The signals summed up are the aforementioned frequency-domain signals 202.

The receiving processing unit 50 derives receiving weight vectors by use of an adaptive algorithm, for example, LMS (Least Mean Square) algorithm. Alternatively, receiving response vectors are derived by correlation processing and then the receiving weight vectors may be derived from the receiving response vectors. Here, the latter case will be described. If a frequency-domain signal corresponding to the first time-domain signal 200a is denoted by $x_1(t)$, a frequency-domain signal corresponding to the second time-domain signal 200b by $x_2(t)$, a reference signal in the first stream by $S_1(t)$ and a reference signal in the second stream by $S_2(t)$, then $x_1(t)$ and $x_2(t)$ will be expressed by the following Equation (2):

$$x_1(t) = h_{11}S_1(t) + h_{21}S_2(t)$$

$$x_2(t) = h_{12}S_1(t) + h_{22}S_2(t) \quad (2)$$

The noise is ignored here. A first correlation matrix $R_1$, with E as an ensemble average, is expressed by the following Equation (3):

$$R_1 = \begin{bmatrix} E[x_1 S_1^*] & E[x_1 S_2^*] \\ E[x_2 S_1^*] & E[x_2 S_2^*] \end{bmatrix} \quad (3)$$

A second correlation matrix $R_2$ among the reference signals is given by the following Equation (4).

$$R_2 = \begin{bmatrix} E[S_1 S_1^*] & E[S_1 S_2^*] \\ E[S_2 S_1^*] & E[S_2 S_2^*] \end{bmatrix} \quad (4)$$

Finally, the first correlation matrix $R_1$ is multiplied by the inverse matrix of the second correlation matrix $R_2$ so as to derive a receiving response vector, which is expressed by the following Equation (5).

$$\begin{bmatrix} h_{11} & h_{21} \\ h_{12} & h_{22} \end{bmatrix} = R_1 R_2^{-1} \quad (5)$$

Then the receiving processing unit 50 computes a receiving weight vector from the receiving response vector.

The transmitting processing unit 52 executes a part, corresponding to a transmission operation, of operations by the baseband processing unit 22. The transmitting processing unit may perform beamforming or eigenmode transmission. These are known techniques and therefore the description thereof is omitted here.

Figure 7:
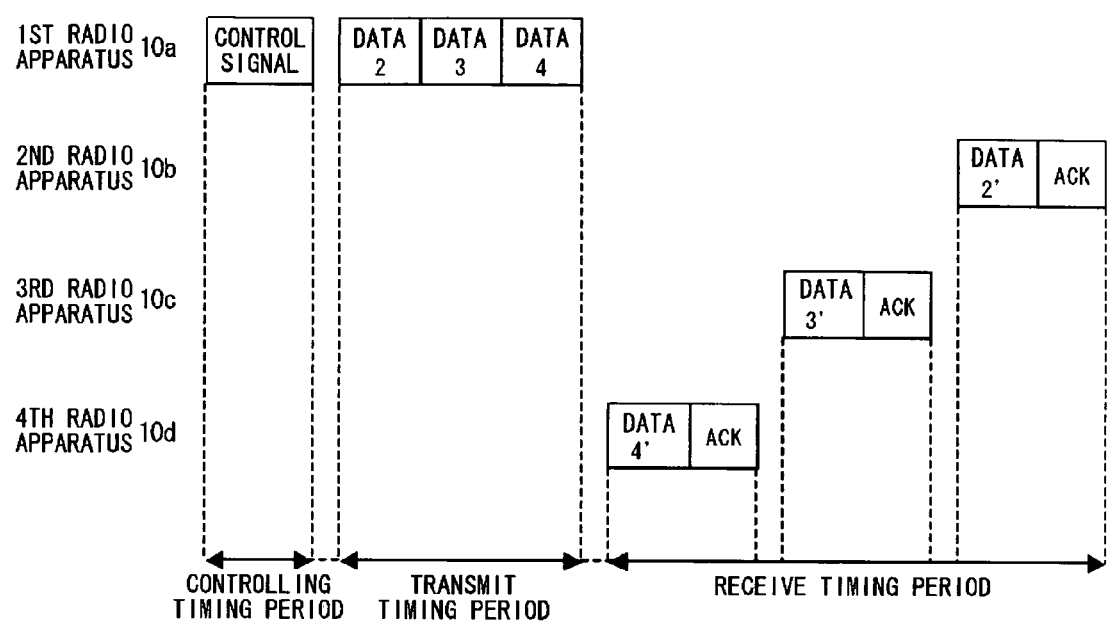
FIG. 7 illustrates an outline of timing assignment in the communication system shown in FIG. 2.

FIG. 7 illustrates an outline of timing assignment in a communication system 100. More specifically, FIG. 7 shows the timings assigned by the control unit 30 and shows the transmit timing of packet signals by the first radio apparatus 10a to fourth radio apparatus 10d. The transmit timing of packet signal by the second radio apparatus 10b to fourth radio apparatus 10d are indicated as the receive timing of packet signal in the first radio apparatus 10a. Here, "controlling timing period", "transmit timing period" and "receive timing period" are placed in this order with a focus on the processing by the first radio apparatus 10a. The control unit 30 has already identified, as the processing speed of terminal apparatuses, that the second radio apparatus 10b is slowest and the fourth radio apparatus 10d is fastest.

The control unit 30 transmits control signals in a controlling timing period. In a transmit timing period, the control unit 30 assigns the transmit timing in the order of "Data 2", "Data 3" and "Data 4". Here, "Data 2" is the data transmitted from the first radio apparatus 10a to the second radio apparatus 10b. "Data 3" is the data transmitted from the first radio apparatus 10a to the third radio apparatus 10c. "Data 4" is the data transmitted from the first radio apparatus 10a to the fourth radio apparatus 10d. That is, as described above, the control unit 30 assigns the leading or earlier transmit timing to the second radio apparatus 10b whose processing speed is lowest. Here, the respective "Data 2", "Data 3" and "Data 4" may have burst formats shown in FIGS. 3A and 3B, respectively. In other words, these may be formed as distinct packet signals.

"Data 2", "Data 3" and "Data 4" may be contained in a part where "Data 1" and "Data 2" are time-shared among the burst format shown in FIGS. 3A and 3B. In other words, these may be formed as a single packet signal. In a receive timing period, the control unit 30 assigns the receive timing in the order opposite to the order of the terminal apparatuses that have transmitted data. That is, the control unit 30 assigns "Data 4'" and "ACK", which are the packet signals transmitted from the fourth radio apparatus 10d, to the beginning of the receive timing period. Following this, the control unit 30 assigns "Data 3'" and "ACK" which are the packet signals from the third radio apparatus 10c. Finally, the control unit 30 assigns "Data 2'" and "ACK" which are the packet signals from the second radio apparatus 10b. It is to be noted "ACK" alone may be transmitted.

Figure 8:
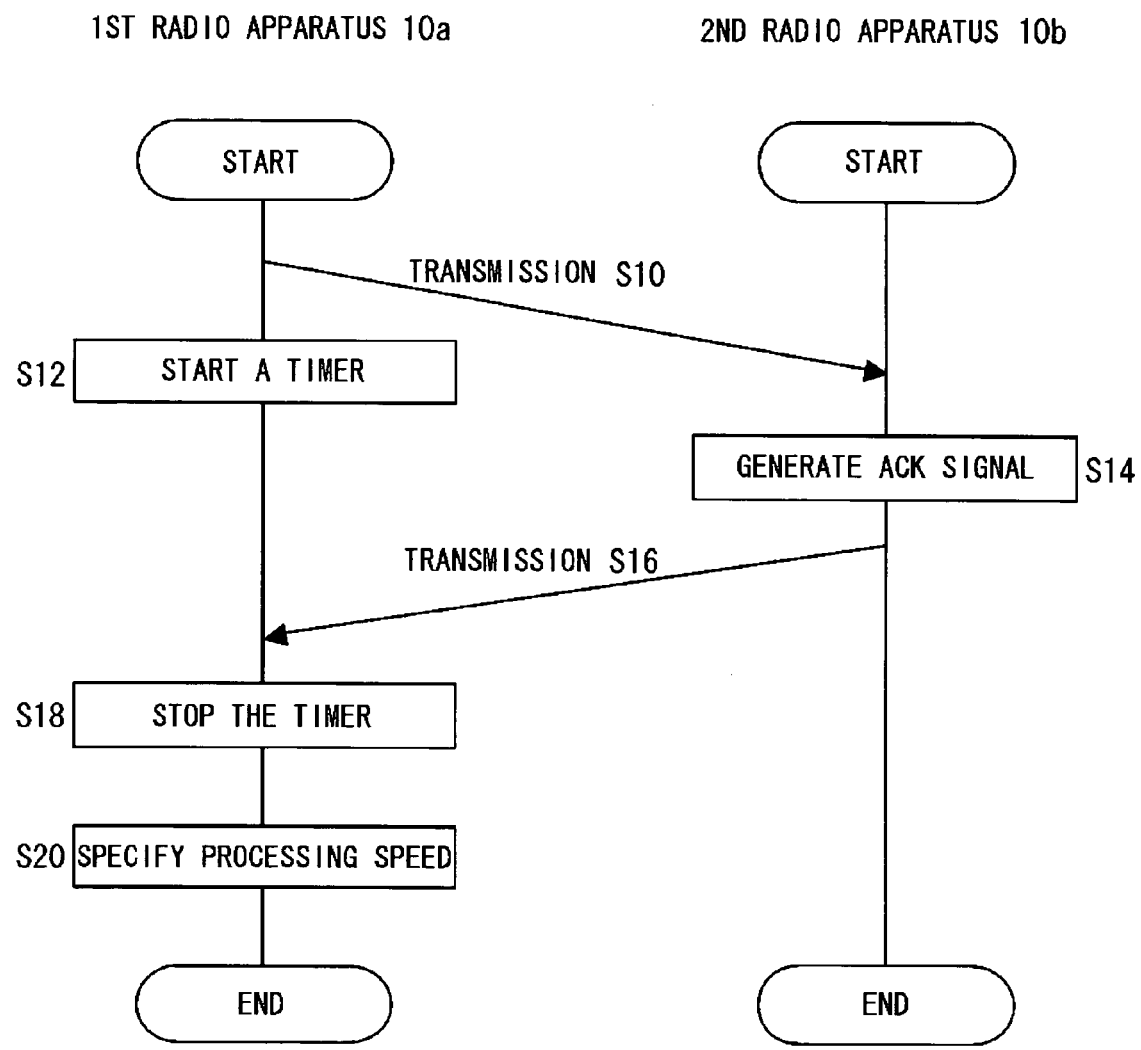
FIG. 8 is a sequence diagram showing a procedure for specifying processing speed in the communication system shown in FIG. 2.

FIG. 8 is a sequence diagram showing a procedure for specifying processing speed in a communication system 100. The first radio apparatus 10a transmits a packet signal to the second radio apparatus 10b (S10) and, at the same time, starts a timer (S12). When the second radio apparatus 10b receives the packet signal, the second radio apparatus 10b generates an ACK signal (S14). The second radio apparatus 10b transmits the ACK signal to the first radio apparatus 10a (S16). When the first radio apparatus 10a receives the ACK signal, the timer is stopped (S18) so as to measure the time from its transmitting the packet signal to its receiving the ACK signal. Then the first radio apparatus 10a identifies the processing speed, based on the thus measured period. It is to be noted that the above processing is performed on not only the second radio apparatus 10b but also the third radio apparatus 10c and the like.

A modification will now be described. Thus far, the control unit 30 specifies respectively processing speeds of a plurality of terminal apparatus, as time required from when the signals are sent respectively to the plurality of terminals and to when the ACK signals are received. Moreover, the control unit allocates transmit timings according to the processing speeds. Here, the number of streams to be transmitted to a plurality of terminal apparatuses are specified respectively. If the number of streams contained in a packet signal is large at the time when a terminal apparatus receives the packet signal, the period during which said packet signals are being processed by the terminal apparatus will be generally longer. This is because the receiving processings for a plurality of streams need to be carried out concurrently. Hence, irrespective of the processing speed of terminal apparatus, the control unit 30 assigns terminal apparatuses, having a large number of streams to be transmitted, in a earlier period of a series of partial periods for transmitting signals. The second radio apparatus 10b shown in FIG. 7 corresponds to the terminal apparatus with a large number of streams to be transmitted.

According to the present embodiments of the present invention, the terminal apparatuses having the longer required time from its receiving the signals to their transmitting ACK signals are assigned in an front period of a series of partial periods for transmitting signals. Thus, the permissible period for a receiving processing in said terminal apparatus can be made longer. Since the permissible period can be made longer, the probability that the ACK signal can be produced in time for when the ACK signal must be sent can be raised. Since the base station apparatus receives the ACK signal earlier, the base station apparatus can perform the subsequent processing earlier. The base station apparatus can so determine the timing as to efficiently communicate with a plurality of terminal apparatuses. The processing speed is identified as the required time from when the signal is received to when the ACK signal is transmitted. Thus, the allocation in accordance with a CPU or the like of terminal apparatus can be realized. Since the processing speed of terminal apparatus is measured in the midst of data communication, the increase in signals to be transmitted can be restricted. Since the increase in signals to be transmitted can be suppressed, the transmission efficiency can be improved.

Next, a description of another modification is given below. In the assignment mode of this modification, partial periods for transmitting signals and partial periods for receiving signals are assigned the same way as for the above-described modification. In this modification, however, the base station apparatus specifies the receive timings for the terminal apparatuses in an order equal to the order in which the transmit timings have been specified to the terminal apparatuses. In other words, if the terminal apparatuses are, for instance, denoted by "1" to "3", the base station apparatus specifies the transmit timings in the order of "1" to "3" and then specifies the receive timings also in the order of "1" to "3". The period during which signals are being transmitted from the base station apparatus is generally longer than the period during which signals are being received by the base station apparatus. Hence, a terminal apparatus assigned for an earlier transmit timing can have a longer duration from its receiving a signal to its transmitting a signal. Accordingly, the base station apparatus assigns earlier transmit timings to the terminal apparatuses for which the required duration from their transmitting a signal to their receiving a response is longer.

The structure of a radio apparatus 10 according to this modification is of the same type as the radio apparatus 10 of FIG. 4. What is different therefrom is the processing at the control unit 30, which is explained here. The control unit 30 defines the order of terminal apparatuses to be assigned to the partial periods for receiving signals to be the same as the order of terminal apparatuses to be assigned to the partial periods for transmitting signals. Furthermore, the control unit 30 assigns terminal apparatuses with lower processing speed to the earlier partial periods in the series of partial periods for transmitting signals.

Figure 9:
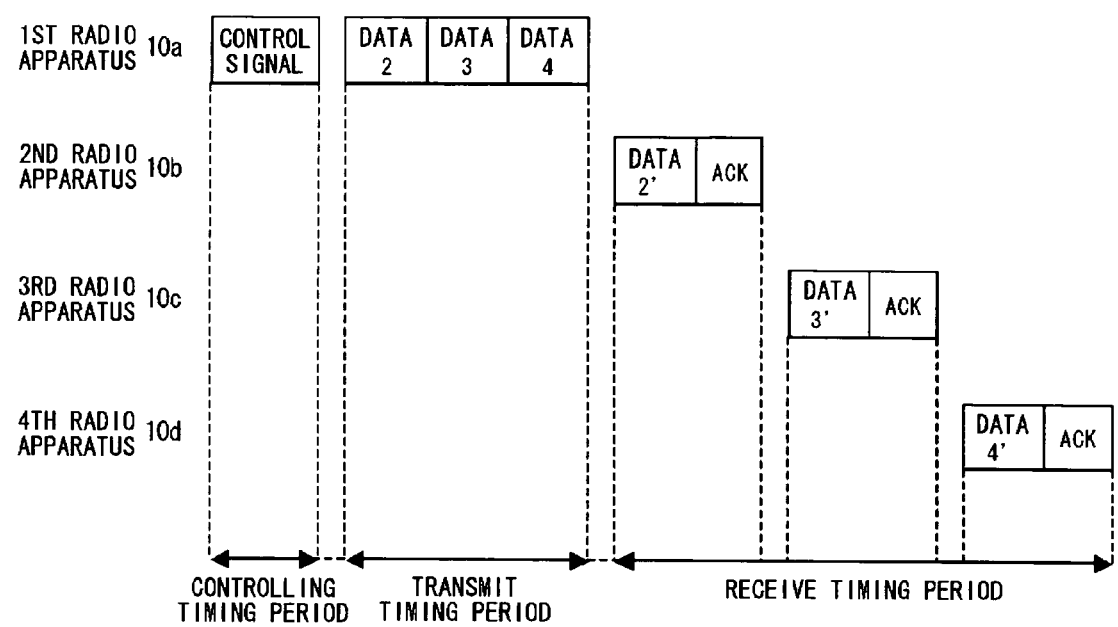
FIG. 9 illustrates an outline of another modification of timing assignment in the communication system shown in FIG. 2.

FIG. 9 is an illustration for explaining the outline of the another modification of the assignment of timings in a communication system 100. FIG. 9 is the same type of illustration as FIG. 7. A control unit 30 transmits a control signal in the controlling timing period. The control unit 30 also assigns transmit timings in the order of "Data 2", "Data 3" and "Data 4" in the transmit timing period. As mentioned earlier, the control unit 30 assigns the leading transmit timing to a second radio apparatus 10b which has the lowest processing speed. The control unit 30 assigns receive timings, in the order of the terminal apparatuses to which data have been transmitted, in the receive timing period. That is, the control unit 30 assigns "Data 2'" and "ACK" in the beginning of the receive timing period. Following that, the control unit 30 assigns "Data 3'" and "ACK". Finally, the control unit 30 assigns "Data 4'" and "ACK".

In a modification like this, the control unit 30 specifies the respective processing speeds for a plurality of terminal apparatuses by way of a required duration from transmission of the respective signals to a plurality of terminal apparatuses to the receiving of the ACK signals. Furthermore, the control unit 30 assigns transmit timings according to the processing speeds. Otherwise, the control unit 30 may specify the respective numbers of streams to be transmitted to a plurality of terminal apparatuses, as a required duration from transmission of respective signals to the plurality of terminal apparatuses to receiving of the ACK signals. In so doing, the control unit 30 assigns the terminal apparatuses with larger numbers of streams to be transmitted to the earlier periods in the series of partial periods for transmitting signals, irrespectively of the processing speeds of the terminal apparatuses. In other words, the second radio apparatus 10b shown in FIG. 9 is equivalent to a terminal apparatus with a larger number of streams to be transmitted.

Next, a description of still another modification is given below. In the assignment mode of this modification, partial periods for transmitting signals and partial periods for receiving signals are arranged the same way as for the above-described modifications. The receive timings for the terminal apparatuses are specified in an order equal to the order in which the transmission timings have been specified to the terminal apparatuses. That is, once the order of transmit timings is determined, the order of receive timings is also determined. The following point, however, differs from the embodiment and modifications described above. The base station apparatus changes the combination of the order of terminal apparatuses to which the order of transmit timings is to be assigned, and estimates the period from the end of transmit timing for the terminal apparatuses to the start of receive timing (hereinafter referred to as "receive-transmit period") for each of the combinations.

Generally speaking, the length of a packet signal transmitted by a base station apparatus and the length of a packet signal received thereby vary with the terminal apparatus. Hence, a change in the order of terminal apparatuses results in a change in the receive-transmit period for each of the terminal apparatuses. The base station apparatus specifies a combination, from among a variety of combinations, that provides a longer receive-transmit period. In so doing, the base station apparatus assigns transmit timings in such a manner that terminal apparatuses with longer receive-transmit periods may be terminal apparatuses with lower processing speeds.

The structure of a radio apparatus 10 according to this modification is of the same type as the radio apparatus 10 of FIG. 4. What is different herein is the processing at the control unit 30, which is explained below. The control unit 30 estimates the receive-transmit period for each of different orders. To facilitate the explanation thereof, two terminal apparatuses are assumed and they are denoted by "1" and "2", respectively. The control unit 30 deals with a combination of "1" and "2" (hereinafter referred to as "first combination") as the order of assignment of transmission timings. In so doing, the control unit 30 derives the receive-transmit period for each of the terminal apparatuses "1" and "2". It is to be noted here that the partial periods for transmitting signals and the partial periods for receiving signals for each of the terminal apparatuses "1" and "2" are recognized beforehand. Following this, the control unit 30 addresses a combination of "2" and "1" (hereinafter referred to as "second combination") as the order of assignment of transmission timings.

In so doing, the control unit 30 derives the receive-transmit period for each of the terminal apparatuses "2" and "1". It is to be noted also that by a similar processing as in the embodiment, the control unit 30 acquires the respective processing speeds of terminal apparatuses "1" and "2" and is in recognition of the processing speed of terminal apparatus "1" being slower. The control unit 30 compares the receive-transmit periods of terminal apparatus "1" for the first combination and the second combination. As a result, if the receive-transmit period in the first combination is longer, the control unit 30 will assign the transmit timings in the order of terminal apparatuses "1" and "2". On the other hand, if the receive-transmit period in the second combination is longer, the control unit 30 will assign the transmit timings in the order of terminal apparatuses "2" and "1". That is, the control unit 30 assigns terminal apparatuses with lower processing speeds to the partial periods corresponding to the order in which the receive-transmit period is longer.

Figure 10:
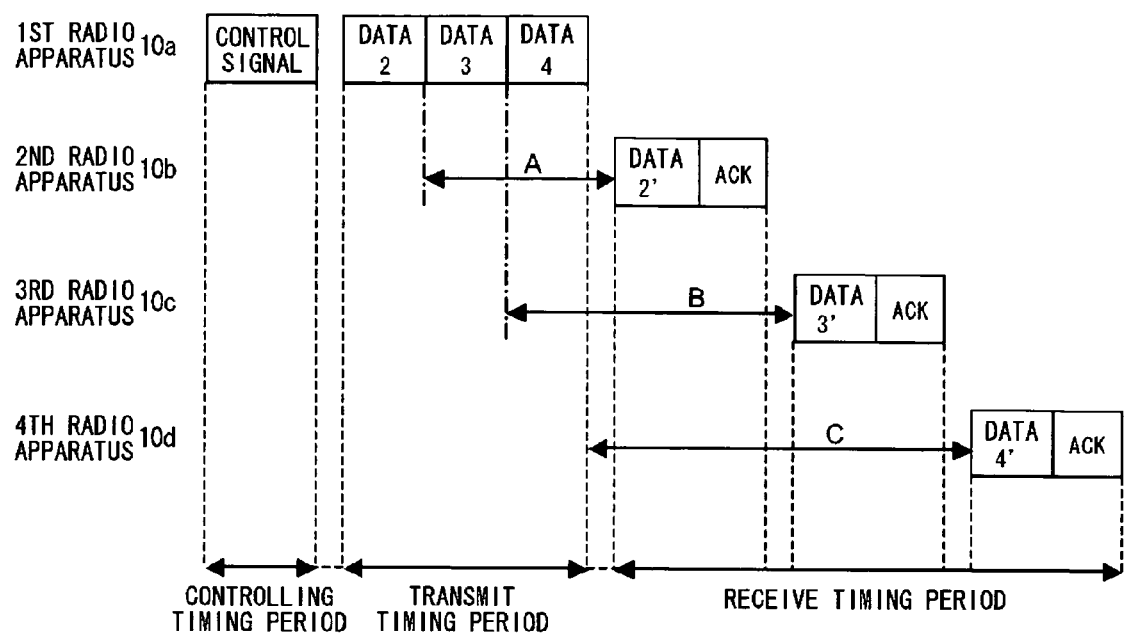
FIG. 10 illustrates an outline of still another modification of timing assignment in the communication system shown in FIG. 2.

FIG. 10 is an illustration for explaining the outline of still another modification of the assignment of timings in a communication system 100. FIG. 10 is the same type of illustration as FIG. 9, so that the different points only will be explained. In FIG. 9, which shows one of a plurality of combinations, the control unit 30 assigns the transmit timings in the order of the second radio apparatus 10b, the third radio apparatus 10c and the fourth radio apparatus 10d. Here "A", "B" and "C" denote the receive-transmit periods for the second radio apparatus 10b to fourth radio apparatus 10d, respectively. Furthermore, the control unit 30 carries out a similar processing to other combinations not shown. As a result, the control unit 30 identifies the receive-transmit period for each radio apparatus 10 in each of the combinations. The control unit 30 acquires the processing speed for each of the second radio apparatus 10b to fourth radio apparatus 10d. Finally, the control unit 30 selects a combination that provides a longer receive-transmit period for the radio apparatus 10 with lower processing speed. As a result, the selected combination determines the orders of the transmit timings and the receive timings.

In a modification like this, the control unit 30 specifies respective processing speeds of a plurality of terminal apparatuses by way of required durations from the transmission of respective signals to the plurality of terminal apparatuses to the receiving of the ACK signals. Furthermore, the control unit 30 specifies assigns transmission timings according to the processing speeds. Otherwise, the control unit 30 may specify the respective numbers of streams to be transmitted to a plurality of terminal apparatuses by way of the required durations from the transmission of the respective signals to the plurality of terminal apparatuses to the receiving of the ACK signals. In so doing, the control unit 30 assigns the terminal apparatuses with larger numbers of streams to be transmitted to the earlier periods in the series of partial periods for transmitting signals, irrespectively of the processing speeds of the terminal apparatuses.

According to the embodiments of the present invention, terminal apparatuses with longer required durations from the receiving of a signal to the transmission of an ACK signal are assigned to the earlier periods in the series of partial periods for transmitting signals, so that the period permissible for receiving processing by the terminal apparatuses can be made longer. And this longer period permissible can increase the possibility of generating an ACK signal before the timing for transmitting the ACK signal. Moreover, the base station apparatus, which receives an ACK signal earlier, can carry out subsequent processing earlier. The base station apparatus can determine communication timings in such a manner as to communicate efficiently with a plurality of terminal apparatuses. Since the processing speeds of terminal apparatuses are specified as the required durations from receiving of a signal to transmission of an ACK signal, the assignment can be accomplished that suits the CPU and the like of the terminal apparatuses.

Since the processing speed of a terminal apparatus is measured during data communication, it is possible to restrict the increase of signals to be transmitted. And this restriction of the increase of signals to be transmitted may improve the transmission efficiency. Since terminal apparatuses with the larger numbers of streams of signals to be transmitted are assigned to the earlier periods in the series of partial periods for transmitting signals, the period permissible for receiving processing by the terminal apparatuses can be made longer. And this longer period permissible can increase the possibility of generating an ACK signal before the timing for transmitting the ACK signal even without the recognition of the processing speeds of the terminal apparatuses.

Use of the same order for the assignment of transmission timings and for the assignment of reception timings can make the processing simpler. Since the terminal apparatuses with lower processing speeds are assigned to the transmission timings for longer receive-transmit periods, it is possible to raise the possibility of transmitting ACK signals by said terminal apparatuses. This assignment of terminal apparatuses with lower processing speeds to the transmission timings for longer receive-transmit periods can raise the possibility of transmitting ACK signals by said terminal apparatuses.

The present invention has been described based on the embodiments and modifications which are only exemplary. It is therefore understood by those skilled in the art that still other various modifications to the combination of each component and process are possible and that such modifications are also within the scope of the present invention.

According to the embodiment of the present invention, in order to identify the processing speeds, the control unit 30 measures the period from the transmission of a packet signal to the receiving of an ACK signal corresponding to said packet signal, for each of the terminal apparatuses. The arrangement, however, is not limited thereto, and the control unit 30 may, for instance, receive information on the processing speed from each of a plurality of terminal apparatuses via a baseband processing unit 22 or the like. The information on the processing speed may correspond to the clock frequency of the CPU provided in the terminal apparatus, for instance. The processing speed may be classified into a plurality of stages, and the information may indicate the stages to which the terminal apparatuses correspond. The control unit 30 may specify the processing speeds based on the thus received information. According to this modification, the accuracy of identifying the processing speeds can be improved. That is, the accuracy is satisfactory if the processing speeds of the terminal apparatuses can be grasped.

In the present embodiments according to the present invention, the communication system 100 uses multi-carriers. However, the present invention is not limited thereto and, for instance, single carrier may be used. As evident from these modifications, the present invention can be applied to various types of communication systems.

While the preferred embodiments of the present invention have been described using specific terms, such description is for illustrative purposes only, and it is to be understood that changes and variations may be made without departing from the spirit or scope of the appended claims.

What is claimed is:

1. A base station apparatus, comprising:
an assigning unit which partitions a given period into a plurality of partial periods and assigns the plurality of partial periods to a plurality of terminal apparatuses, respectively, by associating the partial periods with the terminal apparatuses; and
a communication unit which performs communication with the plurality of terminal apparatuses to which the respective plurality of partial periods have been assigned by said assigning unit,
said assigning unit including:
an estimation unit which estimates a period required from when signals are transmitted, through downlinks, respectively to the plurality of terminal apparatuses to when responses therefrom are received through uplinks; and
an execution unit which assigns the plurality of terminal apparatuses to a plurality of downlink partial periods, respectively, in such a manner that a terminal apparatus whose required period estimated by the estimation unit is longer is assigned to an early downlink partial period of the plurality of downlink partial periods wherein, in the plurality of partial periods, uplink partial periods used to receive signals through uplinks continue after downlink partial periods used to transmit signals through downlinks, and
which assigns the plurality of terminal apparatuses to the plurality of uplink partial periods, respectively, in the order opposite to the order assigned to the plurality of downlink partial periods.

2. A base station apparatus according to claim 1, wherein, in the uplink partial periods, said communication unit receives responses to the signals transmitted in the downlink partial periods.

3. A base station apparatus, comprising:
an assigning unit which partitions a given period into a plurality of partial periods and assigns the plurality of partial periods to a plurality of terminal apparatuses, respectively, by associating the partial periods with the terminal apparatuses; and
a communication unit which performs communication with the plurality of terminal apparatuses to which the respective plurality of partial periods have been assigned by said assigning unit,
said assigning unit including:
an identifying unit which identifies processing speeds for the respective plurality of terminal apparatuses; and
an execution unit which assigns the plurality of terminal apparatuses to a plurality of downlink partial periods, respectively, in such a manner that a terminal apparatus whose processing speed identified by the identifying unit is low is assigned to an early downlink partial period of the plurality of downlink partial periods wherein, in the plurality of partial periods, uplink partial periods used to receive signals through uplinks continue after downlink partial periods used to transmit signals through downlinks, and
which assigns the plurality of terminal apparatuses to the plurality of uplink partial periods, respectively, in the order opposite to the order assigned to the plurality of downlink partial periods.

4. A base station apparatus according to claim 3, wherein the identifying unit measures periods from when signals are transmitted, through downlinks, respectively to the plurality of terminal apparatuses to when responses to said signals are received through uplinks, respectively, and identifies processing speeds based on the measured periods.

5. A base station apparatus according to claim 3, wherein the identifying unit receives information on the processing speeds from the respective plurality of terminal apparatuses, and identifies the processing speeds based on the received information.

6. A base station apparatus, comprising:
an assigning unit which partitions a given period into a plurality of partial periods and assigns the plurality of partial periods to a plurality of terminal apparatuses, respectively, by associating the partial periods with the terminal apparatuses; and
a communication unit which performs communication, using at least one stream, with the plurality of terminal apparatuses to which the respective plurality of partial periods have been assigned by said assigning unit,
said assigning unit including:
an identifying unit which identifies the number of streams used to communicate with each of the plurality of terminal apparatuses; and
an execution unit which assigns the plurality of terminal apparatuses to a plurality of downlink partial periods, respectively, in such a manner that a terminal apparatus whose number of streams identified by the identifying unit is large is assigned to an early downlink partial period of the plurality of downlink partial periods wherein, in the plurality of partial periods, uplink partial periods used to receive signals through uplinks continue after downlink partial periods used to transmit signals through downlinks, and
which assigns the plurality of terminal apparatuses to the plurality of uplink partial periods, respectively, in the order opposite to the order assigned to the plurality of downlink partial periods.

* * * * *